United States Patent
Wong et al.

(10) Patent No.: US 8,190,168 B2
(45) Date of Patent: May 29, 2012

(54) ENHANCED SCHEDULING TECHNIQUES FOR WIRELESS COMMUNICATION NETWORKS

(75) Inventors: Wendy C. Wong, San Jose, CA (US); Nageen Himayat, Fremont, CA (US); Yuval Lomnitz, Herzlia (IL); Timothy F. Cox, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 643 days.

(21) Appl. No.: 12/241,605

(22) Filed: Sep. 30, 2008

(65) Prior Publication Data

US 2010/0081448 A1    Apr. 1, 2010

(51) Int. Cl.
*H04W 72/04* (2009.01)

(52) U.S. Cl. ............ 455/452.1; 455/466; 370/329; 370/331

(58) Field of Classification Search ......... 455/452.1, 455/466; 370/329
See application file for complete search history.

(56) References Cited

U.S. PATENT DOCUMENTS

| | | | | |
|---|---|---|---|---|
| 7,929,408 B2* | 4/2011 | Lee et al. | ........ | 370/203 |
| 2004/0109424 A1* | 6/2004 | Chheda | ........ | 370/331 |
| 2004/0162083 A1* | 8/2004 | Chen et al. | ........ | 455/454 |
| 2004/0214602 A1* | 10/2004 | Aoyama | ........ | 455/561 |
| 2005/0058151 A1* | 3/2005 | Yeh | ........ | 370/445 |
| 2005/0282550 A1* | 12/2005 | Cho et al. | ........ | 455/447 |
| 2007/0291702 A1* | 12/2007 | Nanba et al. | ........ | 370/336 |
| 2008/0037409 A1* | 2/2008 | Ogawa et al. | ........ | 370/201 |
| 2008/0090575 A1* | 4/2008 | Barak et al. | ........ | 455/444 |
| 2008/0144493 A1* | 6/2008 | Yeh | ........ | 370/230 |
| 2008/0186918 A1* | 8/2008 | Tinnakornsrisuphap et al. | ........ | 370/331 |
| 2008/0198906 A1* | 8/2008 | Kim et al. | ........ | 375/211 |
| 2008/0239938 A1* | 10/2008 | Jalloul et al. | ........ | 370/201 |
| 2008/0310324 A1* | 12/2008 | Chaponniere | ........ | 370/254 |
| 2009/0029645 A1* | 1/2009 | Leroudier | ........ | 455/7 |
| 2009/0046573 A1* | 2/2009 | Damnjanovic | ........ | 370/216 |
| 2009/0067375 A1 | 3/2009 | Wong | | |
| 2009/0190537 A1* | 7/2009 | Hwang et al. | ........ | 370/329 |
| 2009/0225728 A1* | 9/2009 | Tao et al. | ........ | 370/337 |
| 2010/0020702 A1 | 1/2010 | Wong | | |

* cited by examiner

*Primary Examiner* — Jinsong Hu
*Assistant Examiner* — Qun Shen
(74) *Attorney, Agent, or Firm* — Carrie A. Boone, P.C.

(57) ABSTRACT

An enhanced beamforming with interference nulling method is an improvement over prior art beamforming with interference nulling techniques. The enhanced method includes two scheduling schemes that allow all base stations to schedule their cell edge users independently and determine the information exchange among base stations over the backbone that is needed to support the scheduling activity. The method uses grouping information to perform distributed scheduling among base stations to schedule downlink transmission to cell edge users, while reducing interference to cell edge users served by neighboring base stations. The enhanced method demonstrates the base station-to-base station coordination and information exchange that is needed to enable independent base station scheduling of their cell edge users.

16 Claims, 11 Drawing Sheets

ENHANCED SCHEDULING TECHNIQUES FOR WIRELESS COMMUNICATION NETWORKS

TECHNICAL FIELD

This application relates to transmissions between base stations and mobile stations in a cellular network and, more particularly, to transmissions involving cell edge mobile stations.

BACKGROUND

Two United States patent applications, U.S. patent application Ser. No. 11/852,277, entitled, BEAMFORMING WITH NULLING TECHNIQUES FOR WIRELESS COMMUNICATION NETWORKS, filed on Sep. 8, 2007 (hereinafter, "first prior art beamforming technique"), and U.S. patent application Ser. No. 11/963,445, entitled, TECHNIQUES FOR WIRELESS COMMUNICATION NETWORKS EMPLOYING BEAMFORMING, filed on Dec. 21, 2007 (hereinafter, "second prior art beamforming technique"), discuss mechanisms of transmit beamforming with nulling for time-division-duplexing (TDD) and frequency division duplexing (FDD) systems.

The first prior art beamforming technique discusses how to identify mobile stations (MS) that will benefit from the technique. Typically, but not always, such mobile stations are located at the edge of a cell, and are thus known herein as cell edge users. As used herein, cell edge users are those mobile stations residing in a first cell which are served by a first base station, but which may receive interference from a second or more base stations located in a second or more cells of a wireless network, with similar power level compared to the signal power level from the first base station. Transmit beamforming with nulling employed by a base station aims to increase the transmit power to its own cell edge user, while reducing interference to cell edge users served by neighboring base stations. Hence, beamforming with nulling is only effective if all the interfering base stations use it simultaneously. Therefore, it is reasonable to assume that a fraction of channel resources is allocated by the system to serving cell edge users only.

The second prior art beamforming technique describes how base station (BS) transmit beamforming weights may be derived, what pilot support is needed, and the information exchange among neighboring base stations over the backhaul. The second prior art beamforming technique includes a grouping process that will determine which base station/mobile station pairs can share the same resources and which pairs cannot share resources, using specified criteria.

Using these prior art beamforming techniques, a base station with M antennas can null out M−1 interferers, while a mobile station with N antennas can null out N−1 interferers. Hence, the system can null out M+N−2 interfering base station/mobile station links. There can be a maximum of M+N−1 base station/mobile station pairs using the same resources. From simulation, it is found that the system can tolerate more than M+N−2 base station/mobile station pairs. The reason is because it is not necessary to completely eliminate interference. It is sufficient if interference is kept lower than the system thermal noise floor. However, for purposes of illustration, the limit of M+N−2 is used throughout the detailed description.

With multiple cell edge users served by multiple base stations, however, it may be difficult to perform scheduling at each base station such that only base station/mobile station pairs that can share are allocated the same resources.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a modification to prior art transmit beamforming with interference nulling techniques is proposed. The proposed beamforming with interference nulling method is an enhancement to two prior art beamforming with interference nulling techniques, described herein. The enhanced beamforming with interference nulling method includes two scheduling schemes that allow all base stations to schedule their cell edge users independently and determine the information exchange among base stations over the backbone that is needed to support the scheduling activity.

The enhanced beamforming with interference nulling method instructs how to use grouping information to perform distributed scheduling among base stations to schedule downlink transmission to cell edge users. At the same time, the enhanced beamforming with interference nulling method reduces interferences to cell edge users served by neighboring base stations. The enhanced method also demonstrates the base station-to-base station coordination and information exchange that is needed to enable independent base station scheduling of their cell edge users. The enhanced beamforming with interference nulling method is applicable to WiMAX II and future cellular network deployments. WiMAX, short for worldwide interoperability for microwave access, is currently defined by the IEEE (Institute of Electrical and Electronics Engineers) 802.16-series specification.

Figure 1:
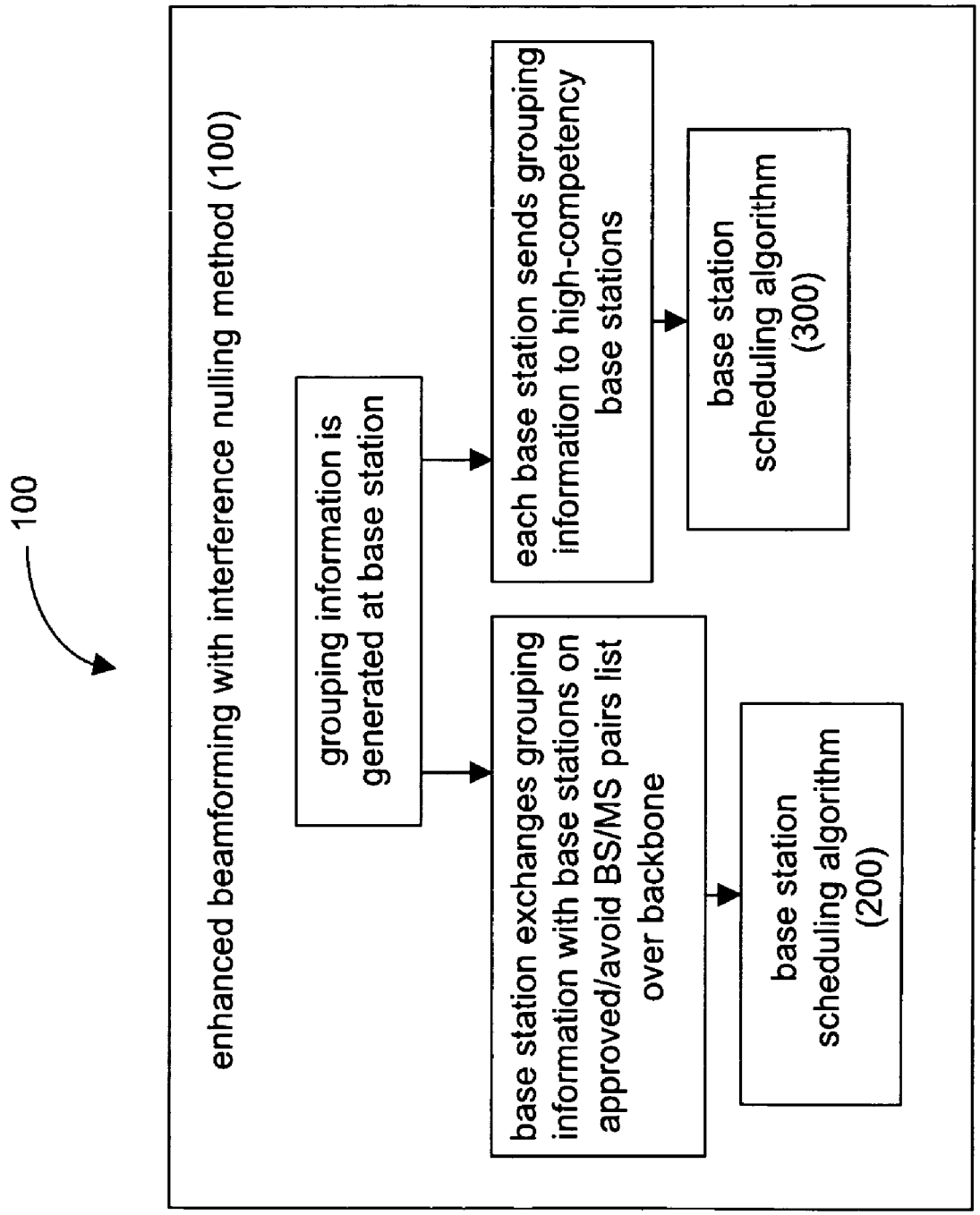
FIG. 1 is a block diagram of an enhanced beamforming with interference nulling method, according to some embodiments.

FIG. 1 is a block diagram of an enhanced beamforming with interference nulling method 100, according to some embodiments. The enhanced beamforming with interference nulling method 100, or method 100, may employ one of two scheduling algorithms, a base station scheduling algorithm 200 and a base station scheduling algorithm 300, each of which is described herein.

The enhanced beamforming with interference nulling method 100 executes one of the two scheduling algorithms, depending on the speed of backbone transmissions among base stations in a cellular network. For base stations that are characterized by fast transmissions with one another, such as is used. After grouping information is generated at the base station on a periodic basis over multiple frames, the base station exchanges grouping information with base stations on the approved BS/MS pairs list and with the avoid BS/MS pairs list over the cellular network backbone. Following this exchange, the enhanced beamforming with interference nulling method 100 executes the base station scheduling algorithm 200 which schedules downlink transmission from the base station to its cell edge users for every frame, described in more detail below. In some embodiments, the grouping happens infrequently compared to the scheduling, which happens every frame. Thus, for determining which scheduling algorithm is to be used, the information exchange that needs to be fast is not the grouping information exchange, but the scheduling information for each frame.

For base stations with slower transmissions with one another, the scheduling algorithm 300 is used. Once the grouping information is generated at the base station, the base station sends grouping information to high-competency base stations. High-competency base stations are base stations that have high computation power and hence can generate the mobile station groups quickly. Following this transmission, the enhanced beamforming with interference nulling method 100 executes the base station scheduling algorithm 300, described in more detail below.

Given a base station with M antennas and a mobile station with N antenna, the proposed method 100 solves the problem of how the various base stations may perform scheduling such that there can be M+N−1 or fewer base station/mobile station pairs sharing the same resources, while causing low interference to one another.

It has been shown that effective transmit beamforming with nulling is possible for any systems that satisfy the following two criteria:

the base station/mobile station pairs scheduled to use the same resource blocks will not include base station/mobile station pairs that cannot share the same resources (1)

the base station/mobile station pairs scheduled to use the same resource blocks will not need to null out more than M+N−2 interferers (2)

These two criteria will be referred to throughout this document as criterion (1), criterion (2), or criteria (1) and (2).

Particular resource allocations are known herein as resource blocks. Resource blocks may include one or more time intervals (e.g., symbol durations) and/or one or more frequency intervals (e.g., subchannels). Resource blocks may be allocated in a variety of ways. For instance, a base station may allocate a particular resource block to one or more of its cell edge mobile stations. If a base station schedules more than one cell edge user, it is using a combination of beamforming with nulling and multiple-input-multiple-output (MIMO) schemes. This combination scheme will become more popular as the number of antennae at a base station increases with better technology. Within this allocated resource (e.g., time slot, frequency slot, and/or the like), the base station may employ downlink transmit beamforming with interference nulling to provide improved signal to interference-plus-noise ratio (SINR) performance (and thus data rates) for the cell edge station. Also, the same resource block may be allocated by multiple base stations. Thus, multiple cell edge mobile stations served by different base stations may receive transmissions within the same resource block.

In some embodiments, the proposed method 100 satisfies criteria (1) and (2). To accommodate various base station-to-base station communication latency, the proposed method 100 includes two scheduling algorithms, scheduling algorithm 200 and scheduling algorithm 300:

The base station scheduling algorithm 200 works with frame-by-frame base station-to-base station coordination. The first scheduling algorithm is geared towards fast backhaul connections using for example fiber optic networks or others The base station scheduling algorithm 300 works with base station-to-base station coordination when new mobile station groups are formed due to changing channel conditions. The second scheduling algorithm is used for slower backhaul connections, and no base station-to-base station communication is needed during scheduling on a frame-by-frame basis As used herein, a mobile station group or mobile station grouping is a set of cell edge mobile stations, served by different base stations, for which resource block allocations may be shared. In other words, for each cell edge mobile station served by a base station, a mobile station grouping identifies one or more (if any) cell edge mobile stations served by other base stations that are suitable for sharing resource block allocations.

The second prior art beamforming technique includes a grouping process that determines which BS/MS pairs can share the same resources and which cannot. Two cell edge mobile stations are selected, a first served by a local base station, the second served by a remote base station. If the first mobile station is susceptible of interference from the remote base station, a link quality metric is obtained and compared to a threshold. If the metric is greater than the threshold, the first and second mobile stations are designated as suitable for same resource allocation, and can become part of a mobile station group. Otherwise, the two mobile stations are deemed unsuitable for such grouping. The process is repeated for other cell edge mobile stations in the wireless neighborhood.

In describing the enhanced beamforming with interference nulling method 100, mobile station MS_n_m, represents a mobile station with an index m served by a base station with an index n and scheduling quantum is the minimum size of channel resource blocks in frequency and time that can be scheduled. Also, cell edge users are mobile stations that suffer from interference from neighboring base stations. As the name suggests, the cell edge users are most likely (but not always) located at the edge of a cell. The cell edge users are most likely to benefit from transmit beamforming with interference nulling.

Figure 2:
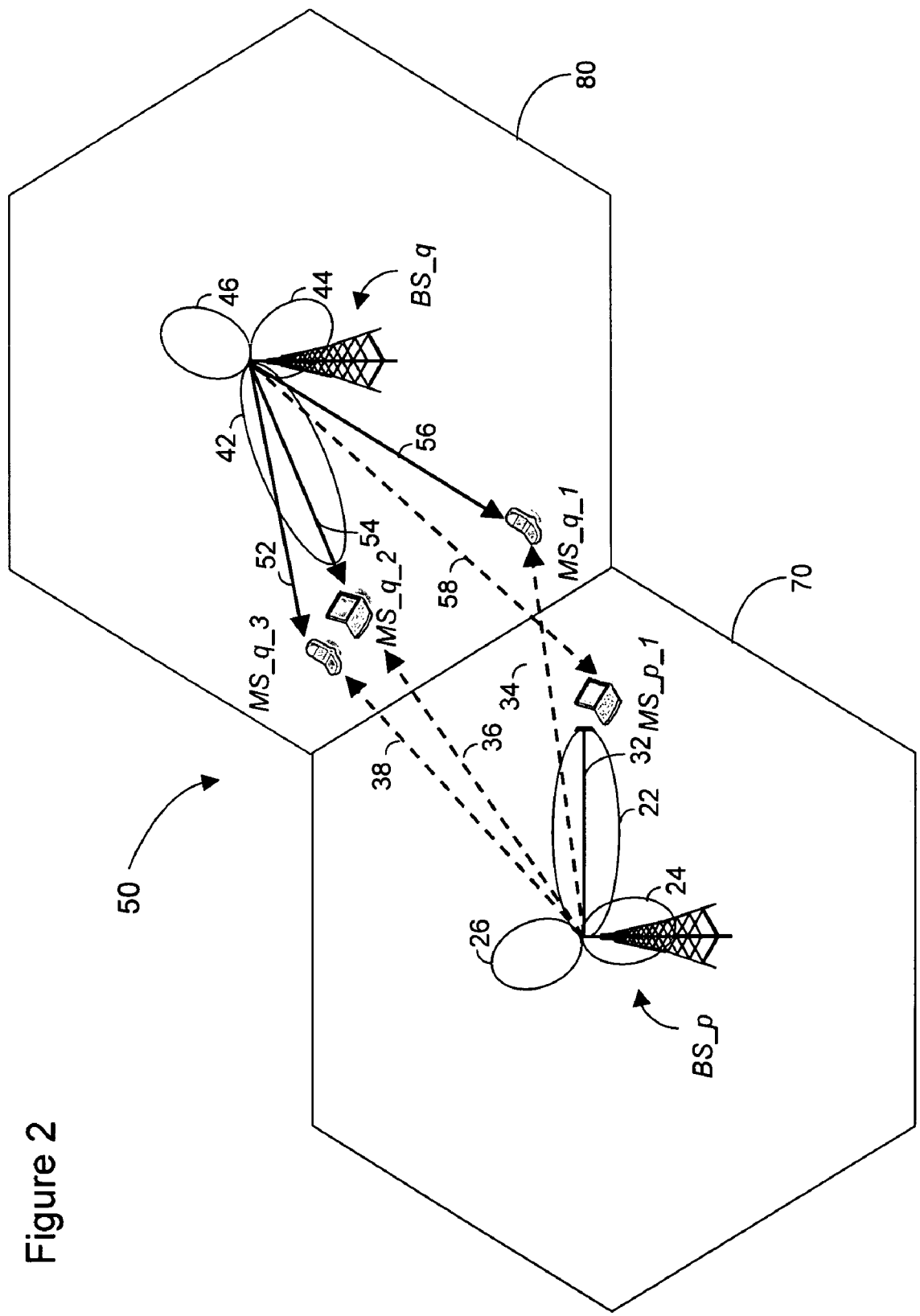
FIG. 2 is a diagram of a cellular network using the enhanced beamforming with interference nulling method of FIG. 1, according to some embodiments.

FIG. 2 is a diagram of a wireless neighborhood 50 including two cells 70, 80, according to some embodiments. Cell 70 includes a base station BS_p and a mobile station MS_p_1; cell 80 includes a base station BS_q and three mobile stations MS_q_1, MS_q_2, and MS_q_3. Mobile stations MS_p_1, MS_q_1, MS_q_2, and MS_q_3 are cell edge mobile stations. Base station BS_p communicates wirelessly with mobile station MS_p_1. Base station BS_q communicates wirelessly with mobile stations MS_q_1, MS_q_2, and MS_q_3. In some embodiments, the wireless signals are modulated according to orthogonal frequency division multiplexing (OFDM) and/or orthogonal frequency division multiple access (OFDMA) technologies.

Base stations BS_p and BS_q each include multiple antennas. Through these antennas, each base station uses the enhanced beamforming with interference nulling method 100, described herein, to improve the strength of signals transmitted to the mobile station it serves and to attenuate the strength of signals transmitted to mobile stations served by other base stations. In the wireless neighborhood 50, the base station BS_p forms a beam 32 for communication with the mobile station MS_p_1 and the base station BS_q forms a beam 54 for communication with the mobile station MS_q_2. Each of the beams may include a main lobe and multiple side lobes. In FIG. 2, beam 32 has main lobe 22, side lobe 24, and side lobe 26 while beam 54 has main lobe 42, side lobe 44, and side lobe 46.

According to the beamforming with interference nulling technique, the base stations also form null towards specified mobile stations served by other base stations to block transmission to them. Thus, base station BS_p forms null 36 towards mobile station MS_q_2 or null 38 to mobile station MS_q_3 depending on which mobile station is scheduled by base station q. Alternatively, base station BS_p forms null 36 towards mobile station MS_q_2 and null 38 to mobile station MS_q_3 if BS_q schedules to transmit information to both of them using the same resources. Thus, if BS_q only schedules MS_q_2 or MS_q_3, then BS_p forms only one null toward the mobile station that is being scheduled by BS_q. If, instead, BS_q schedules to two cell edge users MS_q_2 and MS_q_3 employing MU-MIMO (multi-user MIMO) schemes, then BS_p will simultaneously form two nulls toward MS_q_2 and MS_q_3 to reduce its interference towards them. The base station BS_p may thus use the enhanced beamforming with interference nulling method 100 such that beam 32 points its main lobe 22 toward mobile station MS_p_1 while also pointing nulls 36 and 38 towards mobile stations MS_q_2 and MS_q_3, respectively. Similarly, base station BS_q may use the method 100 such that beam 54 points its main lobe 42 toward the mobile station MS_q_2 while also pointing null 58 towards mobile station MS_p_1.

From FIG. 2, it is possible to see how base station/mobile station pairs can be put on the approved list or avoid list described above. The base station/mobile station pair BS_p/MS_p_1 is on the approved list of BS_q/MS_q_2. Likewise, BS_q/MS_q_2 is on the approved list of BS_p/MS_p_1. However, BS_q/MS_q_1 and BS_p/MS_p_1 are on each other's avoid list. BS_p cannot form a beam towards MS_p_1 while at the same time form a null towards MS_q_1 since MS_q_1 lies in the beam formed by BS_p towards MS_p_1. Likewise, BS_q cannot form a beam towards MS_q_1 while at the same time forming a null towards MS_p_1 since MS_p_1 lies in the beam formed by BS_q towards MS_q_1.

Figure 3:
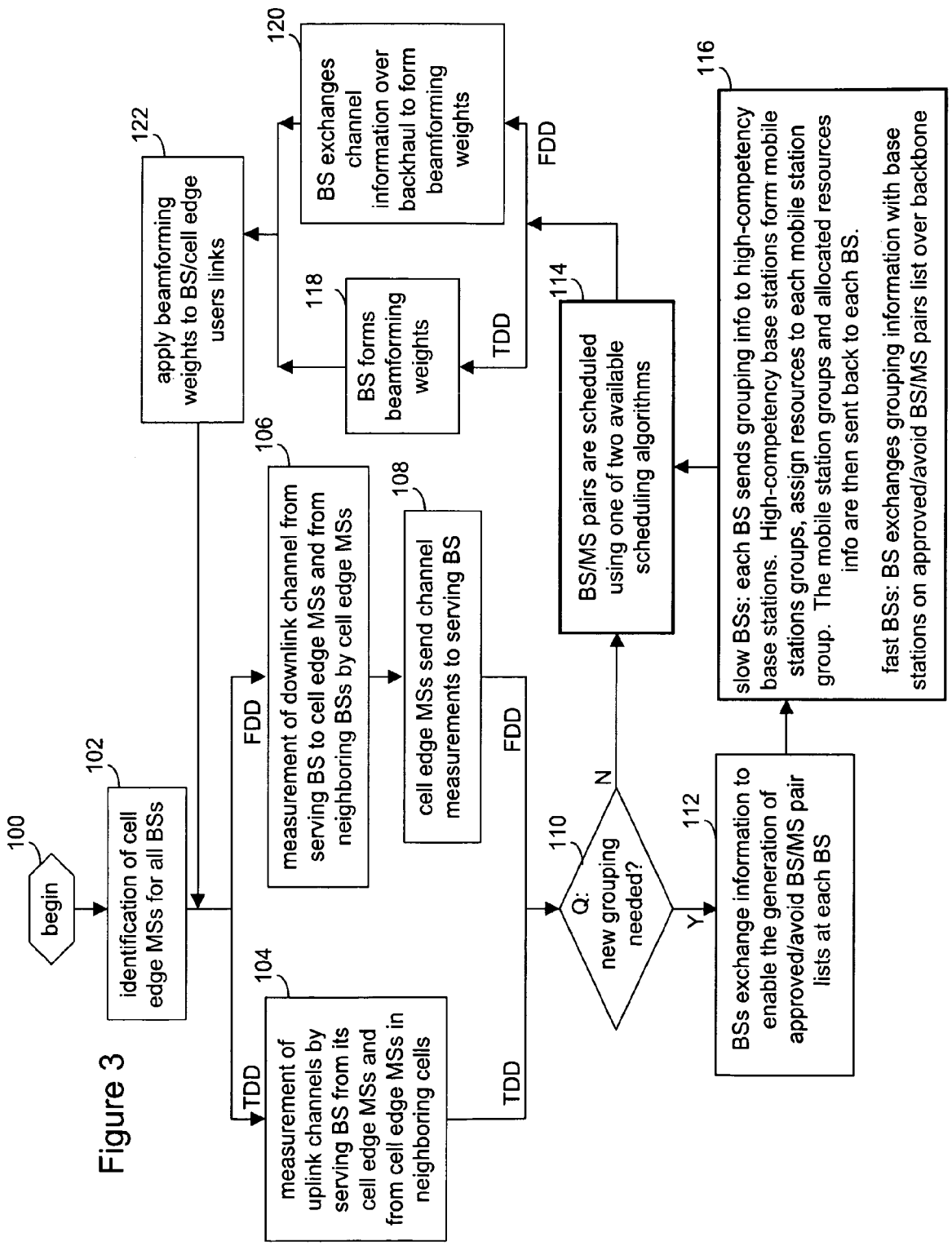
FIG. 3 is a flow diagram depicting operations of the first and second prior art beamforming techniques, as well as operations performed by the enhanced beamforming with interference nulling method of FIG. 1, according to some embodiments.

FIG. 3 is a flow diagram showing operations performed by the enhanced beamforming method 100, according to some embodiments. The operations may be performed for either time-division duplexing (TDD) systems or frequency-division duplexing (FDD) systems. The operations commence with the identification of cell edge mobile stations for all base stations in a given wireless network (block 102). The identification operations are described in detail in the second prior art beamforming technique introduced above. For TDD networks, the serving base station measures uplink channels from its cell edge mobile stations and from cell edge mobile stations in neighboring cells (block 104). For FDD networks, each cell edge mobile user measures downlink channels from its serving base station to itself and from neighboring base stations to itself (block 106). The cell edge mobile stations next send the channel measurements to the serving base station (block 108). The operations of blocks 104, 106, and 108 are described more fully in the first prior art beamforming technique.

For both TDD and FDD systems, the enhanced beamforming method 100 inquires whether a new BS/MS grouping is needed (block 110). Details about the grouping analysis of block 110 are found in the second prior art beamforming technique. At the end of the grouping exercise, each base station (base station p) shall have the following information for each of its cell edge users (mobile station MS_p_m, where MS_p_m is defined as a mobile station with index m is served by base station with index p) for each of its scheduling quanta allocated to cell edge users:

List of approved base station/mobile station pairs (approved BS/MS pairs). Base station/mobile station pairs on this list can share the same resources with BS_p/MS_p_m List of avoid base station/mobile station pairs (avoid BS/MS pairs). Base station/mobile station pairs on this list cannot share the same resources with BS_p/MS_p_m Since grouping is performed on a slow time scale, this information exchange for grouping shall not trigger a traffic overload on the backhaul network.

Once a determination has been made that new grouping is needed (the "yes" prong of block 110), each base station exchanges its grouping information with base stations that are on its approved/avoid BS/MS pairs list (block 112). This may be needed where the channel and operating environments have changed. In some embodiments, grouping is periodically performed at all base stations. If two base stations do not interfere with each other, they will not have each other in their approved/avoid BS/MS pairs list and no grouping information exchange is needed between these two base stations. In some embodiments, all base stations with cell edge users perform this grouping operation, irrespective of their presence on an approved list or an avoid list.

Figure 5:
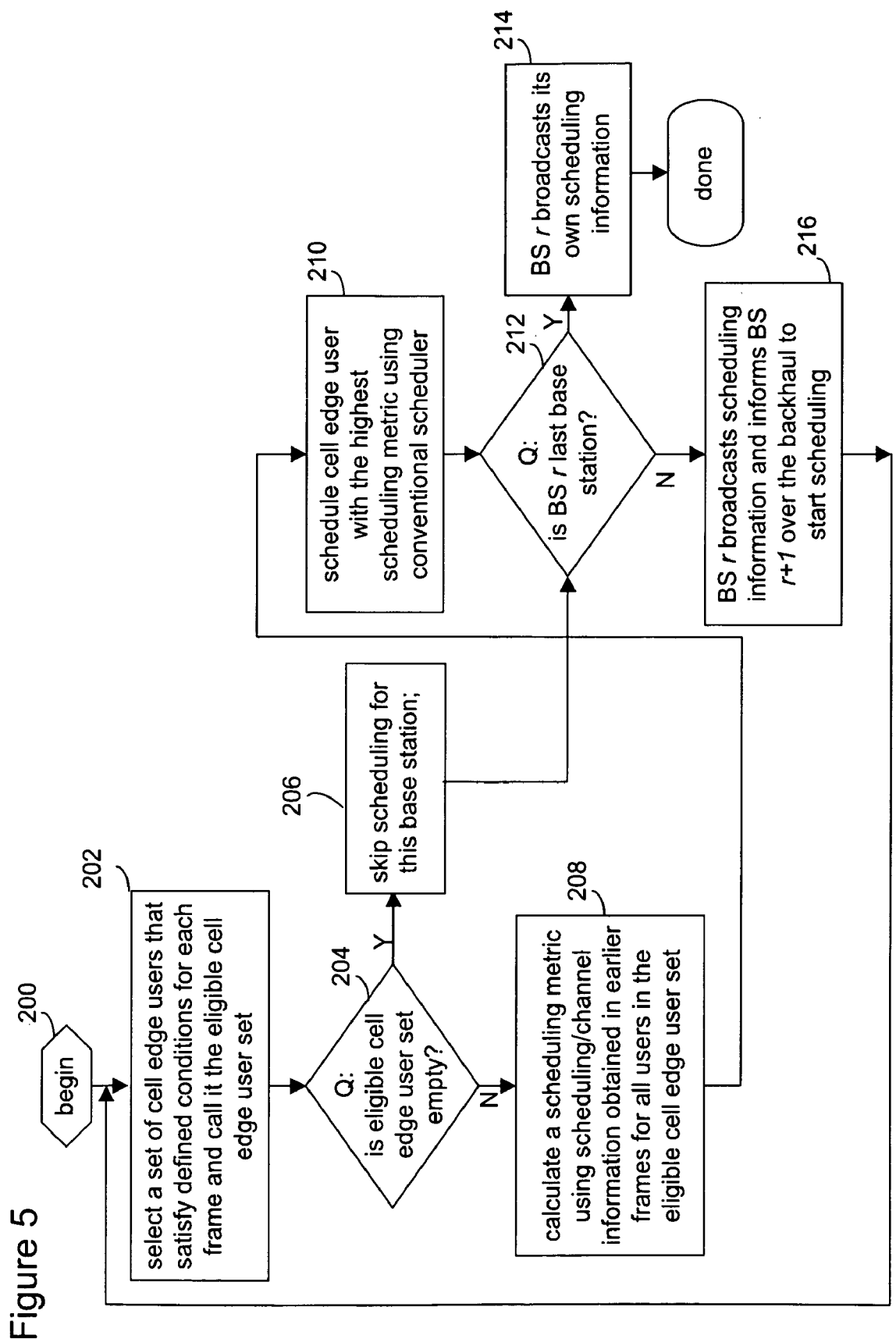
FIGS. 5 and 6 are flow diagrams depicting operations of a first scheduling algorithm of the enhanced beamforming method of FIG. 1, according to some embodiments.
Figure 7:
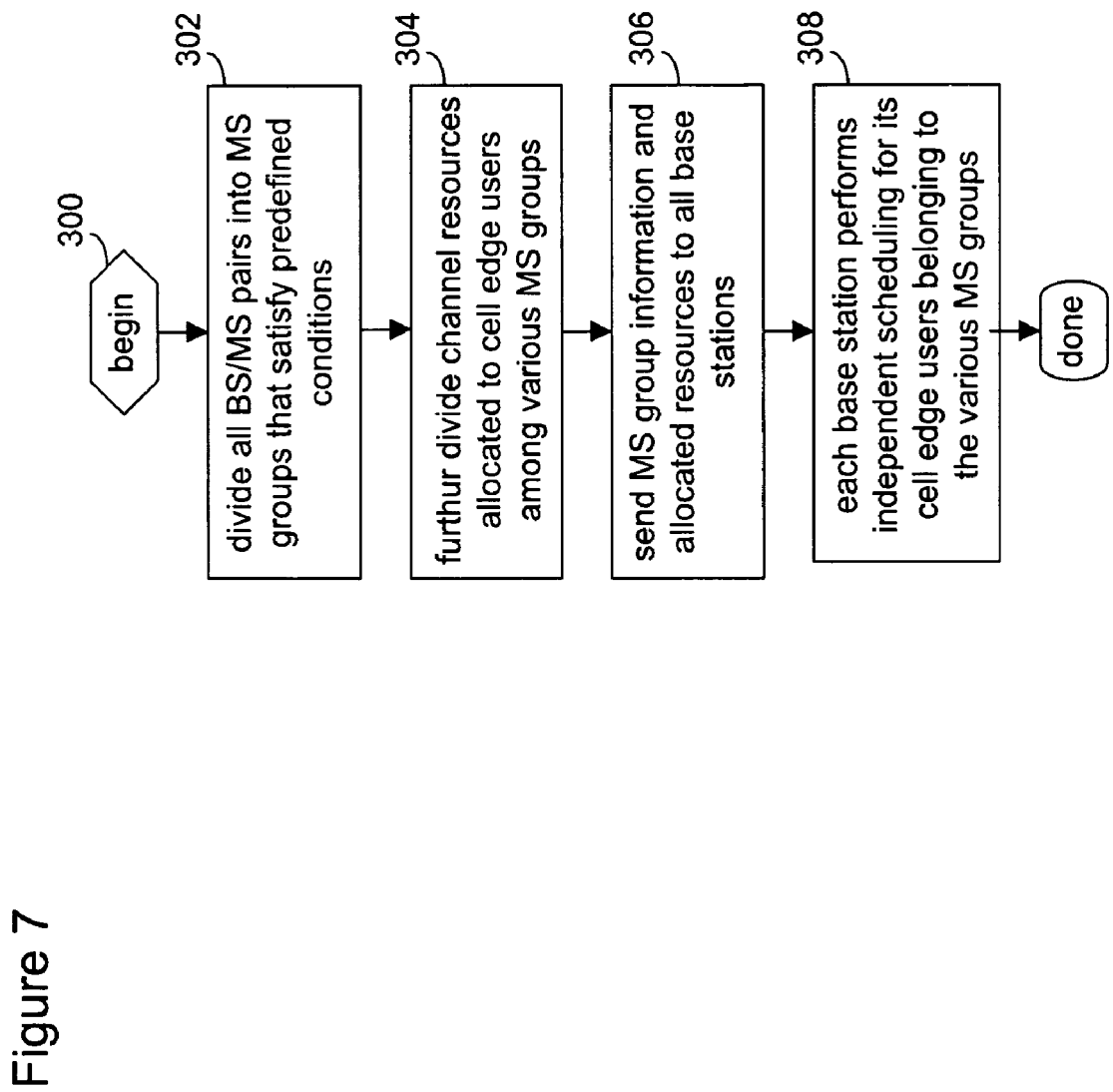
FIGS. 7, 8, 9, and 10 are flow diagrams depicting operations of a second scheduling algorithm of the enhanced beamforming method of FIG. 1, according to some embodiments.

The next operations of FIG. 3, blocks 114 and 116, are not disclosed by the first and second prior art beamforming techniques. If new grouping is deemed as needed (the "yes" prong of block 110), the next operations of the base station depend on whether the base stations have fast backhaul connections, such as fiber optic networks, or slower backhaul connections. In the first case, the base stations exchange their BS/MS approve and BS/MS avoid lists with other relevant base stations in the wireless network that are on its own approve/avoid lists (block 116) to enable scheduling algorithm 200 (block 114). Otherwise, each base station sends grouping information to high-competency base stations, as defined above (block 116) and scheduling algorithm 300 is used (block 114). In the latter case, the BS/MS pairs are scheduled, without base station coordination and information exchange, over the backhaul using scheduling algorithm 300.

Where scheduling algorithm 300 is used, each base station in the system sends its list of approved/avoid BS/MS pairs for its cell edge users to several high-competency base stations. The high-competency base stations first form mobile station groups from all base station/mobile station pairs in the system. The scheduling algorithms 200 and 300 are described in more detail, below. FIG. 5 illustrates operations performed by the scheduling algorithm 200. FIG. 7 illustrates operations performed by the scheduling algorithm 300.

The operations of FIG. 3 diverge, depending on whether the environment is a TDD or an FDD network. In the TDD environment, no channel information exchange is needed over the backhaul to form beamforming weights (block 118). Where the environment is FDD, the base station exchanges channel information over the backhaul to form beamforming weights (block 120). Subsequently, for either FDD or TDD networks, the beamforming weights are applied to base station/cell edge user links (block 122). The process is then repeated for other cell edge mobile stations.

Base Station Scheduling Algorithm 200

The base station scheduling algorithm 200 is built on the following idea: for any base station, if it knows what other base stations have scheduled in a scheduling quantum in advance, this base station can avoid scheduling its mobile stations that are on the avoid BS/MS pairs of the already scheduled BS/MS pairs. Instead, the base station only schedules mobile stations that are on the approved BS/MS pairs of the already scheduled BS/MS pairs that would not exceed the nulling capacity of base stations already scheduled.

This implies that base station scheduling shall be performed in a sequential manner with one base station at a time. After scheduling is completed at a given base station, the base station shall broadcast its scheduling information to all base stations that are on its approved/avoid BS/MS pair lists.

First, the base station scheduling algorithm 200 will propose that all base stations with cell edge users be arranged into a sequence. A base station that is earlier in the sequence will schedule its cell edge user first before the next base station in the sequence. To improve fairness, the base station order in the sequence changes periodically. Base stations scheduled earlier can take resources away from base stations that schedule later and hence starve those later base stations. One way to arrange base stations is to use the base station identifier (BS ID) to arrange the base station scheduling. The base station with the smallest BS ID would be first in the list at the beginning, in some embodiments. Scheduling is performed for some number, H, of frames, before the whole base station sequence is circularly shifted to the left/right by one.

Figure 4:
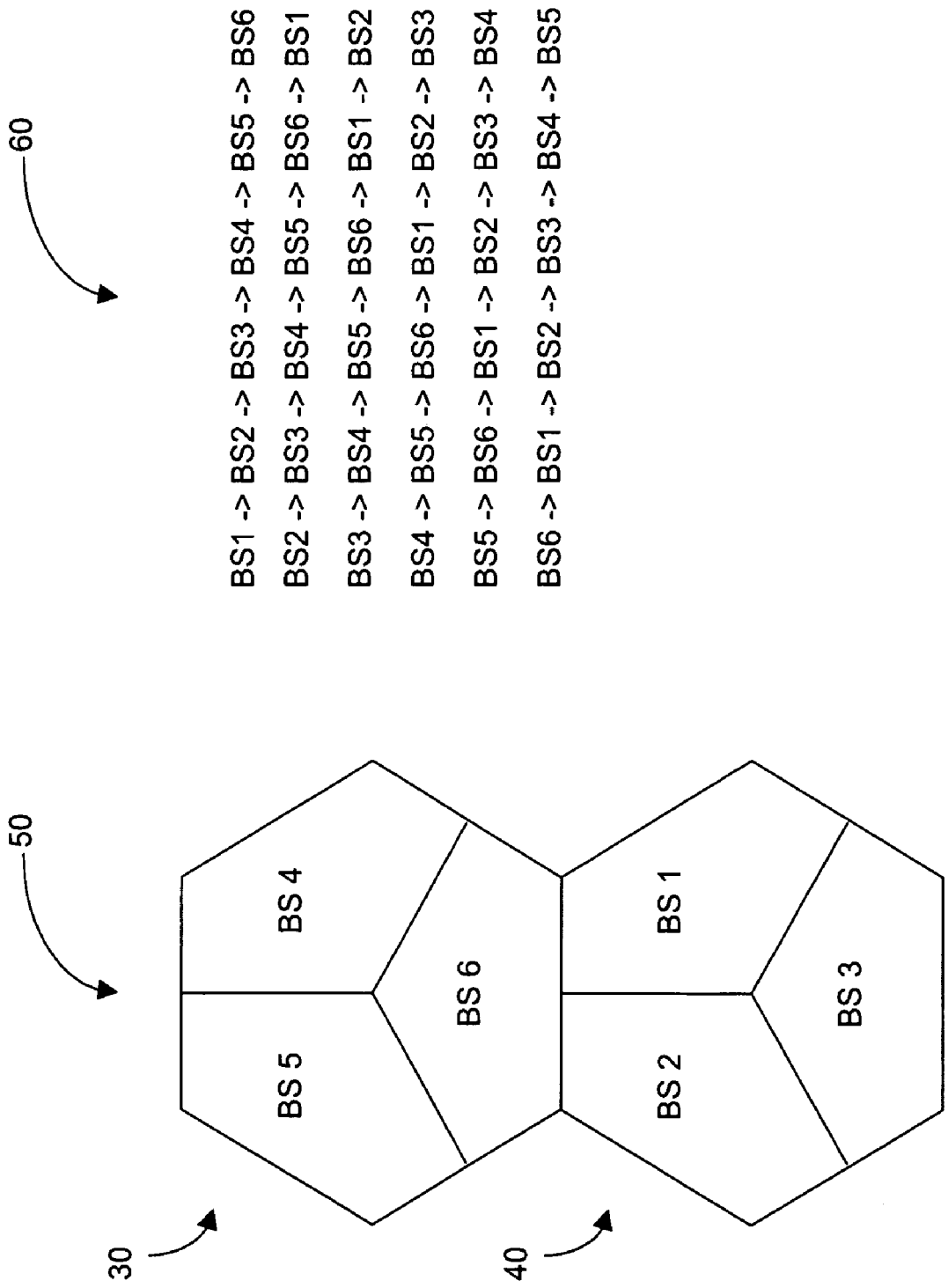
FIG. 4 is a diagram of two cells of the cellular network of FIG. 2, each cell including three base stations, according to some embodiments.

FIG. 4 depicts an arrangement of six base stations, BS1-BS6, occupying two cells 30, 40 of the wireless network 50, and an example scheduling sequence 60 of those six base stations. The scheduling sequence 60 shows that the base station, BS 1, will schedule first, followed by base station, BS 2, base station BS 3, and so on until base station BS 6. After H frames, the scheduling sequence is shifted by one, such that base station BS 2 is first in the sequence, followed by base stations BS 3, BS 4, BS 5, and BS 6, and finally followed by the first base station BS 1. The sequence continues to be shifted by one in the scheduling sequence 60 until all base stations have started the sequence. Other methods to generate base station sequences can be used as well.

For the scheduling algorithm 200, at the beginning of scheduling, each base station (BS_p) shall form an eligible cell edge user set among all its cell edge users (MS_p_m) that satisfies the following conditions:

the BS_p/MS_p_m pair is not on the avoid list of BS/MS pairs already scheduled and to be scheduled for synchronous HARQ (a)

the avoid list of the BS_p/MS_p_m pair shall not contain any BS/MS pairs already scheduled and BS/MS pairs to be scheduled for synchronous HARQ (b)

adding the BS_p/MS_p_m pair to the already scheduled BS/MS pairs and to be scheduled for synchronous HARQ will not increase the number of interferers for all BS/MS pairs in the new set (containing BS_p/MS_p_m, already scheduled BS/MS pairs and HARQ BS/MS pairs) to be more than M+N−2. (c)

where HARQ is a hybrid automatic repeat request. Conditions (a) and (b) is done to ensure that interference caused by sharing resources among the various BS/MS pairs is kept low. Condition (c) ensures that the system nulling capacity is not exceeded by making sure that no BS/MS pairs in the new scheduling set shall need to null out more than M+N−2 BS/MS pairs that are on its approved BS/MS pair list and are also found in the set.

In some embodiments, conditions (a) and (b) ensure that the base station scheduling algorithm 200 will satisfy criterion (1). Condition (c) ensures that the base station scheduling algorithm 200 will satisfy criterion (2). Next, the base station shall schedule the cell edge mobile station in the eligible cell edge user set with the highest metric using any conventional schedulers.

Figure 6:
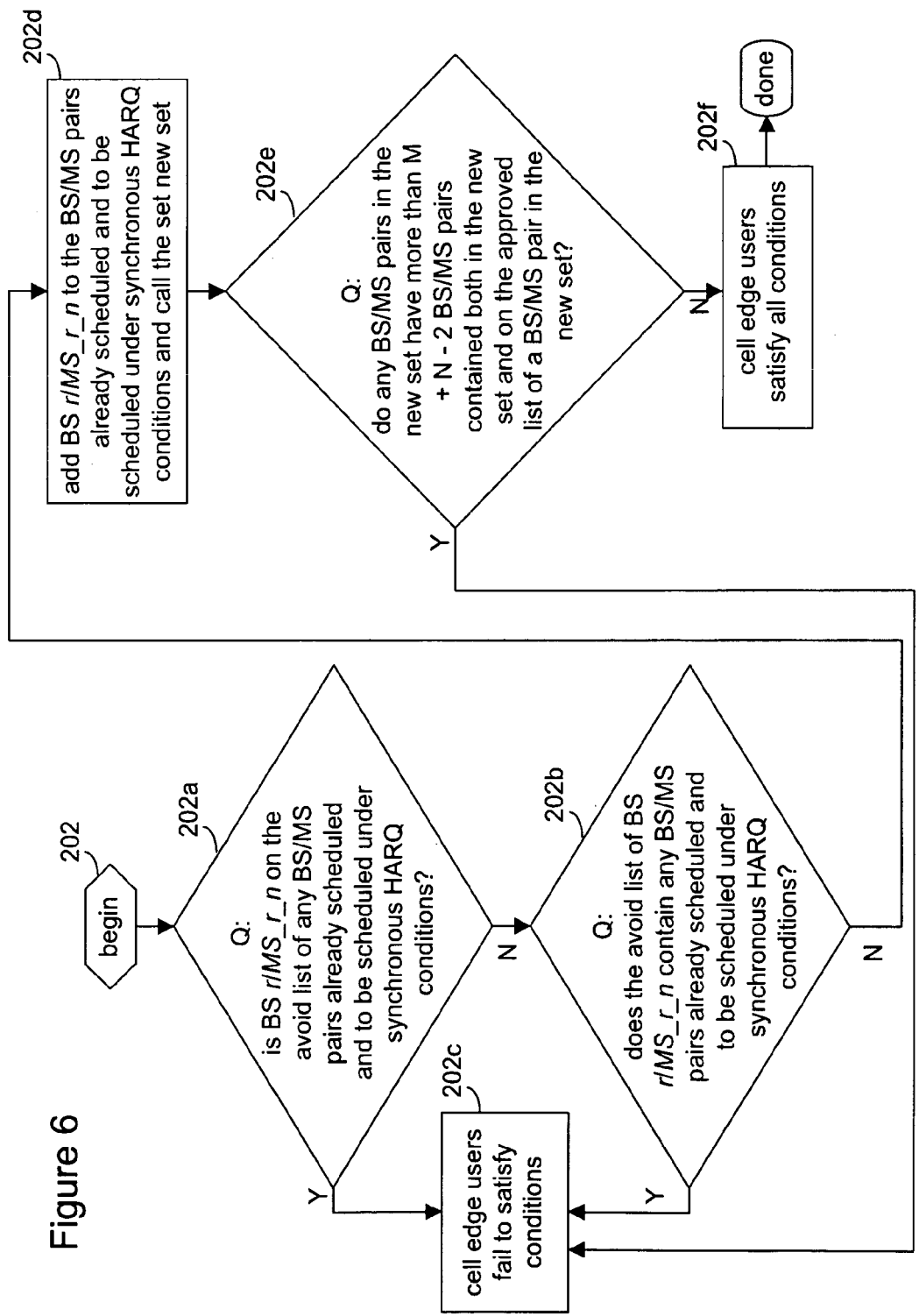

The scheduling algorithm 200 for each scheduling quanta allocated to cell edge users at the $r^{th}$ base station is illustrated in the flow diagrams of FIGS. 5 and 6, according to some embodiments. The scheduling algorithm 200 begins by selecting a set of cell edge users that satisfy a list of predefined conditions (block 202) for each frame and calling the selected cell edge users an eligible cell edge user set.

The conditions in selecting cell edge users into the eligible cell edge user set are illustrated in the flow diagram of FIG. 6. First, the BS r/MS_r_n is not on the avoid list of any BS/MS pairs already scheduled and to be scheduled under synchronous HARQ conditions (block 202a). Also, the avoid list of BS r/MS_r_n does not contain any BS/MS pairs already scheduled and to be scheduled under synchronous HARQ conditions (block 202b). The scheduling algorithm 200 adds BS r/MS_r_n to the BS/MS pairs already scheduled and to be scheduled under synchronous HARQ conditions to a set known as, "new set" (block 202d). Further, no BS/MS pairs in the new set shall have more than M+N−2 BS/MS pairs contained in the new set and are on the approved BS/MS lists of a BS/MS pair in the new set (block 202e). This implies that no BS/MS pairs in the new set have to null out more than M+N−2 interferers. If the cell edge users satisfy all conditions (block 202f), they are included in the eligible cell edge user set and further processed, as indicated in FIG. 5. Otherwise (block 202c), the cell edge user will not join the eligible user set and will not be scheduled for this frame.

Returning to FIG. 5, if the eligible cell edge user set is empty (the "yes" prong of block 204), scheduling for the base station is skipped, and the next base station (BS r+1) is prompted to begin scheduling (block 206). Otherwise, the eligible cell edge user set is not empty (the "no" prong of block 204) and BS r gets to start scheduling (block 208).

For each eligible cell edge user in the set, a scheduling metric is calculated using scheduling/channel information obtained in earlier frames. The cell edge user with the highest scheduling metric is then scheduled using any conventional scheduler, such as a proportional fairness algorithm (block 210). If base station r is the last base station (the "yes" prong of block 212), base station r broadcasts its own scheduling information (block 214). Otherwise, base station r is not the last base station (the "no" prong of block 212), base station r broadcasts its own scheduling information (block 216) and the scheduling algorithm 200 begins again for the next base station (block 202).

The base station scheduling algorithm 200 is designed for base stations connected to fast backhaul with short base station-to-base station communication latency compared to the wireless frame duration. In some embodiments, where there is long base station-to-base station communication latency, the base station scheduling algorithm 300 is used.

As illustrated in the flow diagram of FIG. 5, after completing its scheduling, each base station broadcasts its scheduling information to all base stations that are on its approved/avoid BS/MS pair lists, then informs the next base station in the sequence to start scheduling.

Even though scheduling is done independently for each base station, base stations need to receive the scheduling information from an earlier base station in the sequence before the later in sequence base station can commence scheduling. Hence, in order for the scheduling algorithm 200 to succeed, the communication latency among base station-to-base station is low, in some embodiments.

Base Station Scheduling Algorithm 300

The second base station scheduling algorithm 300 is designed for systems with long base station-to-base station communication latency. Compared to the algorithm 200, above, base stations can carry out their scheduling in a parallel manner without waiting for decisions made by other base stations using the base station scheduling algorithm 300. Since the base stations operate in a decentralized fashion, the scheduling algorithm 300 is more relaxed in dealing with base station-to-base station communication delay than is the scheduling algorithm 200. The scheduling algorithm 300 is described more fully in the flow diagrams of FIGS. 7, 8, 9, and 10.

FIG. 7 is a flow diagram depicting operations performed by the scheduling algorithm 300, according to some embodiments. The scheduling algorithm starts by first dividing all BS/MS pairs into mobile station groups that satisfy predefined conditions (block 302). In some embodiments, the mobile station grouping is a two-step process, with the first step outlined in FIG. 8 and the second step shown in FIG. 9.

In essence, the scheduling algorithm 300 first divides BS/MS pairs into mobile station groups in which:

BS/MS pairs in a mobile station group shall not have each other on their avoid list; and Within each mobile station group, each BS/MS pair will not need to null out on average more than M+N−2 BS/MS pairs on its approved BS/MS pair list and belonging to the same mobile station group Within the mobile station groups, the scheduling algorithm 300 also (second step):

associates each BS/MS pair to as many mobile station groups as possible to increase its chance of being allocated resources;

ensures that each mobile station group contains close to the same number of BS/MS pairs;

ensures that the number of BS/MS pairs to null out are similar (generates same level of inter-cell competition); and ensures that the number of BS/MS pairs from the same BSs are similar (and thus generates the same level of intra-cell competition)

Figure 10:
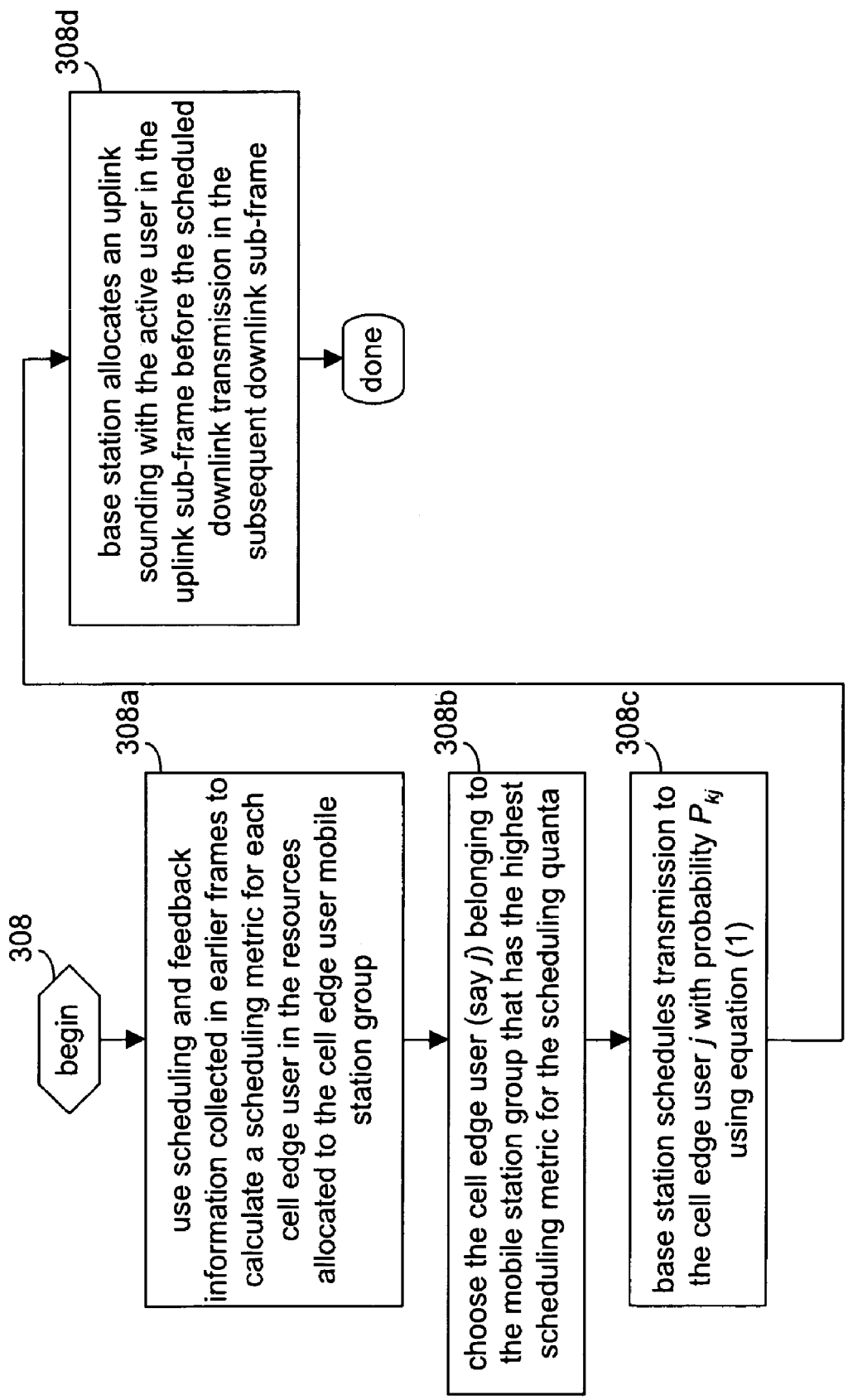

Returning to FIG. 7, once the mobile station groups have been vetted, the scheduling algorithm 300 divides channel resources to the various mobile station groups (block 304). After the mobile station groups information and the resources allocated to each mobile station groups are available at each base station (block 306), each base station can then perform independent scheduling for its cell edge users belonging to the various mobile station groups (block 308). FIG. 10 is a flow diagram describing the independent scheduling operations of block 308 more particularly. In some embodiments, mobile station grouping happens on a periodic basis of multiple frames while independent scheduling (block 308) happens every frame.

Figure 8:
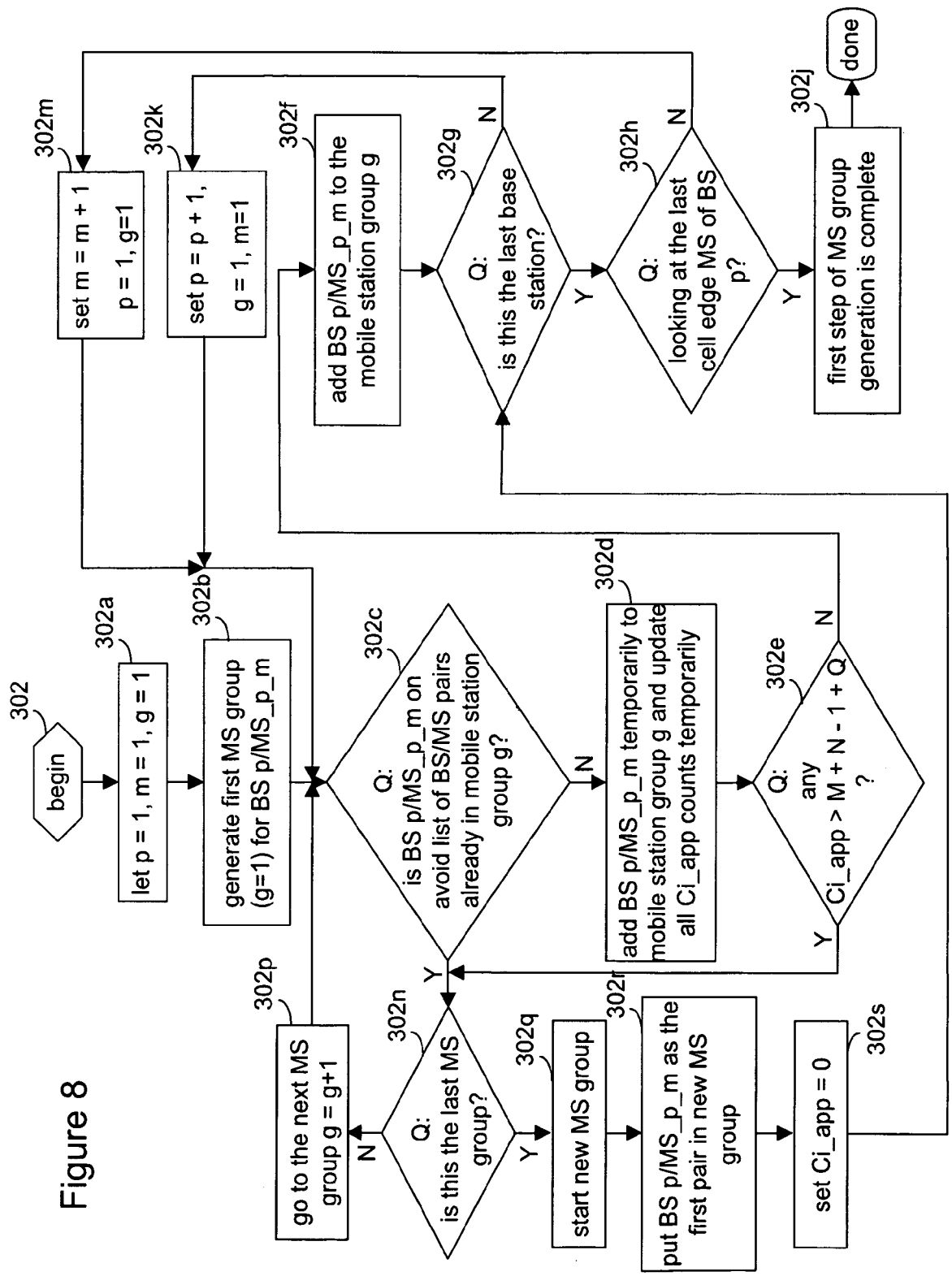
Figure 9:
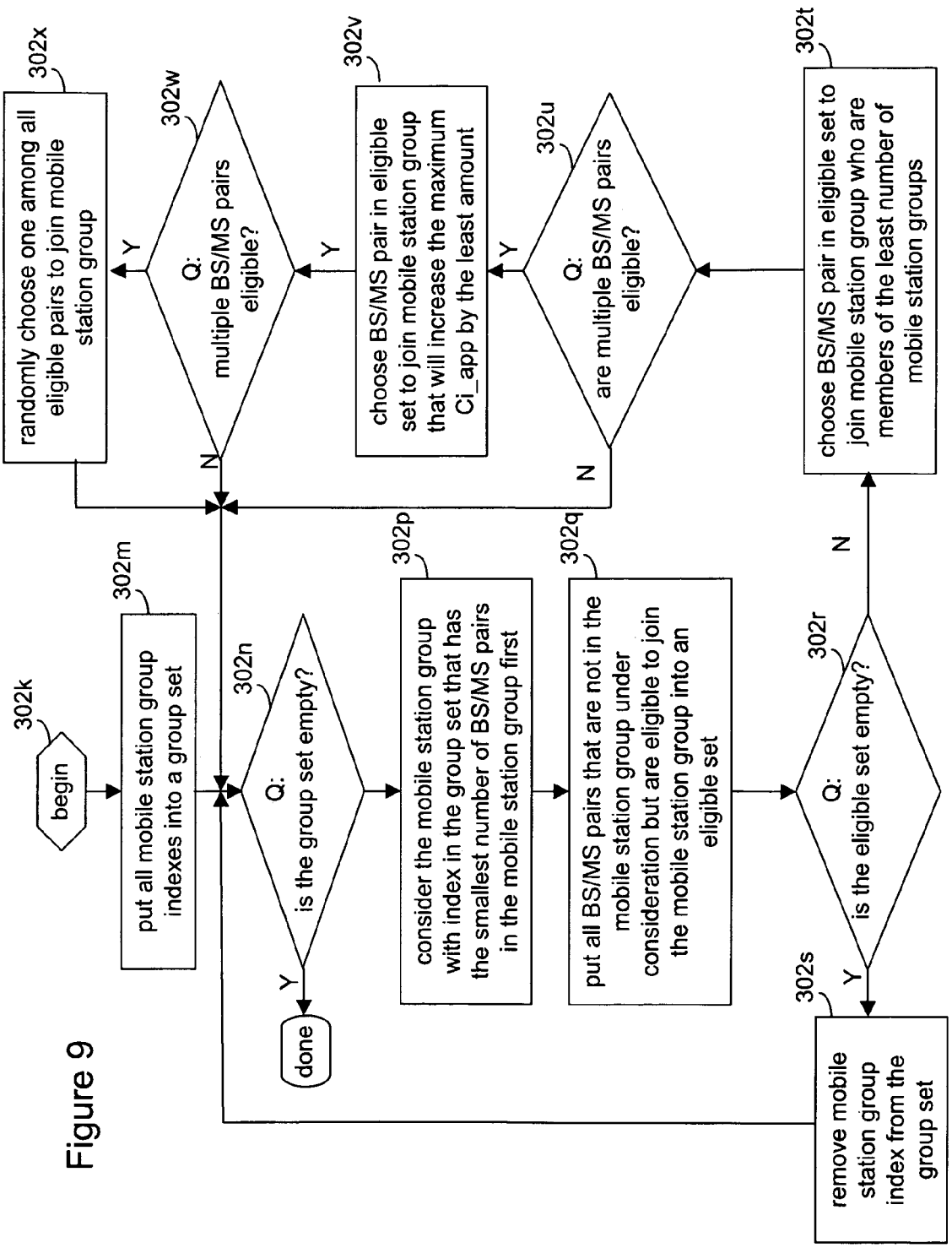

A process for generating mobile station groups for the base station scheduling algorithm 300 is illustrated in the flow diagrams of FIG. 8 and FIG. 9, according to some embodiments. Indexes p, g and m are initialized to one (block 302$a$). Then, a first mobile station group is generated for BS_p/MS_p_m (block 302$b$). Then, a determination is made whether the BS_p/MS_p_m is on the avoid list of BS/MS pairs already in the mobile station group (block 302$c$). If so, the process (in block 302$c$) is repeated for the next mobile station group (block 302$p$), if one exists (block 302$n$). If, instead, the BS_p/MS_p_m is not on the avoid list, BS_p/MS_p_m is added temporarily to the mobile station group (block 302$d$). Further, all Ci_app counts are updated temporarily, where Ci_app is the number of BS/MS pairs with a distinct base station index that are on the $i^{th}$ BS/MS pairs approved list and are also in the mobile station group. For example, if BS 1/MS 2 and BS 1/MS 3 are on BS/MS pair i's approved list and are in the mobile station group, the two pairs are counted once and not twice in calculating Ci_app. Ci_app indicates the potential number of interfering BS/MS pairs that need to be nulled out by BS/MS pair i.

Next, an inquiry is made whether any Ci_app is greater than M+N−2+Q, where Q is an integer value. Q may be zero or a positive value, and is adjusted according to network operation conditions. If so (the "yes" prong of block 302$e$), the next mobile station group (block 302$p$) is examined, if one exists (block 302$n$), and the process is repeated. Otherwise (the "no" prong of block 302$e$), the BS_p/MS_p_m pair is added to the mobile station group (block 302$f$). The algorithm 300 is complete if this is the last base station and the last cell edge user of the last base station (blocks 302$g$, 302$h$), or the base station index or the cell edge user index (if the last base station is reached) is incremented (block 302$k$), and the process is repeated for the next base station. Otherwise, the mobile station group generation is complete (block 302$j$).

The second step in mobile station group generation can be found in FIG. 9, in some embodiments. In essence, the second step is trying to add BS/MS pairs to the mobile station group that has the least number of BS/MS pairs therein. In addition, the chosen BS/MS pair added to a mobile station group shall belong to the least number of mobile station groups and create the least impact on the mobile station group in terms of increasing the maximum Ci_app.

FIG. 9 begins with all mobile station group indexes being put into a group set (block 302$m$). If the group set is empty (block 302$n$), the operations are complete. Otherwise, the mobile station group with index in the group set that has the smallest number of BS/MS pairs is processed first (block 302$p$). Further, all BS/MS pairs that are not in the mobile station group chosen in block 302$p$ but are eligible to join the mobile station group are put into an eligible set (block 302$q$). To be eligible to join a mobile station group, two conditions must be satisfied. First, a BS/MS pair w must not be on the avoid list of BS/MS pairs already in the mobile station group and BS/MS pair w must not contain any BS/MS pairs already in the mobile station group on its avoid BS/MS pair list. Second, the BS/MS pair w must not increase Ci_app of itself and of BS/MS pairs already in the mobile station group to greater than M+N−2+Q. If the eligible set turns out to be empty (block 302$r$), the mobile station group index is removed from the group set (block 302$s$) and the process is repeated for the remaining mobile station groups with indexes still in the group set. Otherwise, if the eligible set is not empty, a BS/MS pair in the eligible set is chosen to join a mobile station group having the smallest number of BS/MS pairs with indexes in the group set (block 302$t$).

If multiple BS/MS pairs in the eligible set satisfy the criterion of block 302t (block 302u), a BS/MS pair i in the eligible set is chosen to join the mobile station group that will increase the maximum Ci_app by the least amount (block 302v). Recall that Ci_app indicates the potential number of interfering BS/MS pairs that need to be nulled out by BS/MS pair i. If there exist still multiple BS/MS pairs satisfying the criteria of block 302v (block 302w), a BS/MS pair is randomly chosen among all of the eligible pairs (block 302x). The process is repeated until the group set is finally empty.

The generation of mobile station groups is completed at several high-competency base stations. At the end of mobile station groups generation, each base station that did not perform the mobile station grouping shall receive the following information:
 mobile station groups that include cell edge users of this base station and other information (see Table 1)
 scheduling quanta associated with all mobile station groups of this base station With the scheduling algorithm 300, the mobile station grouping is performed on a slow time scale. The information exchange for grouping shall not trigger a traffic overload.

| MS group K member | Number of potential BS/MS pairs needed to be nulled out |
| --- | --- |
| BS/MS pair 1 | C1_app |
| BS/MS pair 2 | C2_app |
| ... | |
| BS/MS pair i | Ci_app |
| ... | |
| BS/MS pair n | Cn_app |

FIG. 10 is a flow diagram further describing the independent scheduling operation (FIG. 7, block 308) of the scheduling algorithm 300, according to some embodiments. At each base station, the scheduling operation is performed for all scheduling quanta allocated to mobile station groups that contain cell edge users belonging to the base station. The scheduling algorithm 300 uses the scheduling and feedback information collected in earlier frames to calculate a scheduling metric for each of its cell edge users in the resources allocated to the cell edge user mobile station group (block 308a). The scheduling algorithm 300 chooses the cell edge user (say user j) that has the highest scheduling metric for the scheduling quanta (block 308b). The base station will actually schedule the transmission to the cell edge user j with probability $P_{kj}$ calculated by equation (1), described below (block 308c). After performing scheduling for all its cell edge users over all the allocated quanta, the base station shall allocate an uplink sounding with the active user in the uplink sub-frame before the scheduled downlink transmission in the subsequent downlink sub-frame (block 308d). No base station information exchange is needed in this case. Other base stations can determine which BS/MS pairs are scheduled to transmit by listening to the uplink sounding and form proper beamforming weights. In addition to being used by the scheduling algorithm 300, the uplink sounding method can be used by the scheduling algorithm 200 for each base station to form proper beamforming weights.

Figure 11:
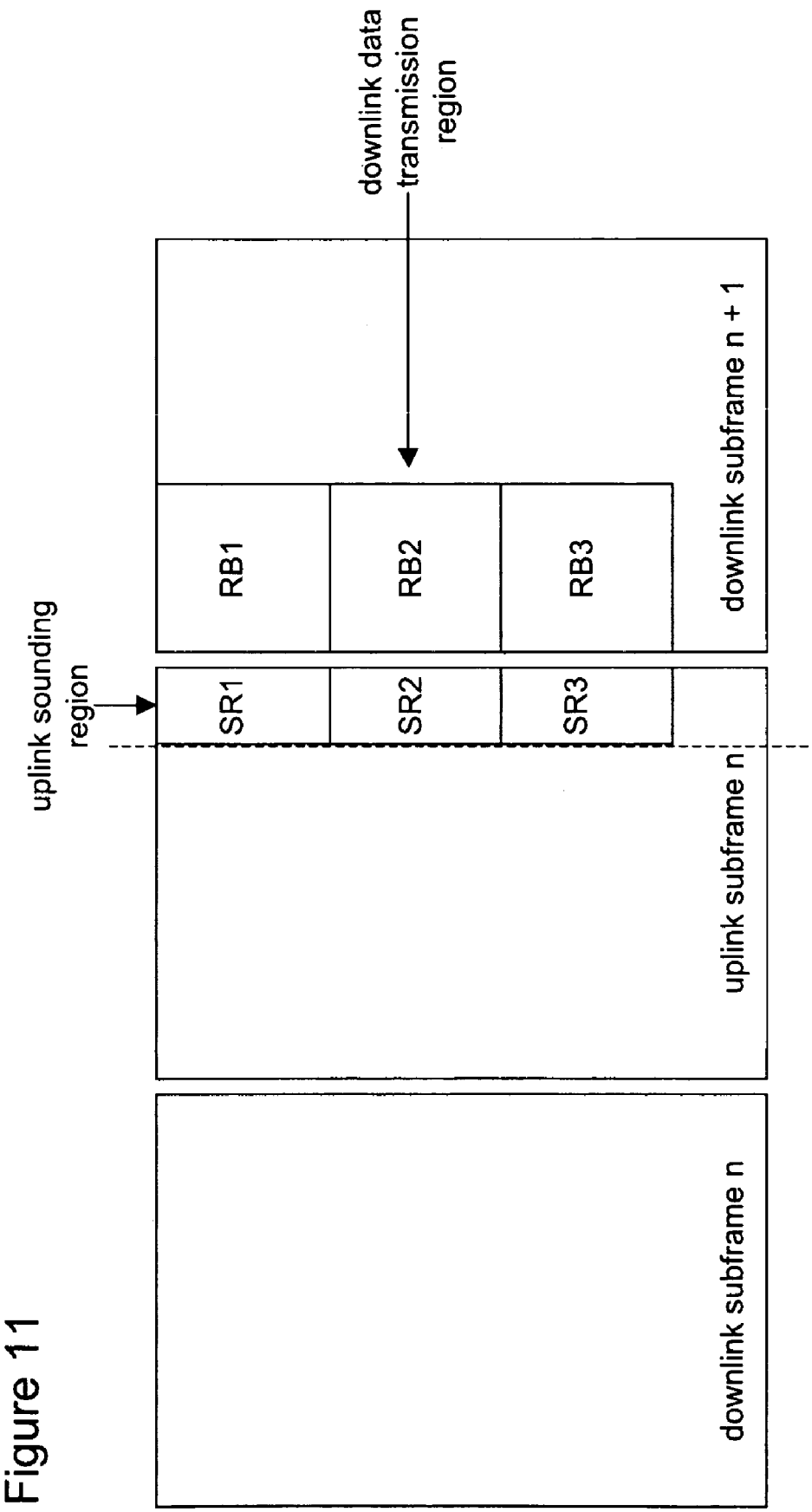
FIG. 11 is a diagram of a special uplink sounding region used by the enhanced beamforming method of FIG. 1, according to some embodiments.

As an alternative to having the base stations exchange their scheduling information over the backhaul at the end of each frame, an overhead increase is generated in the uplink sub-frame due to the uplink sounding symbol, in some embodiments. FIG. 11 is a diagram of a special uplink sounding region occupying three transmission subframes, a downlink subframe n, an uplink subframe n, and a downlink subframe n+1, according to some embodiments. The special uplink sounding region is used for base stations to communicate to each other their scheduling decision, thus enabling the base stations to calculate beamforming weights. In general, base stations that allocate transmission to their cell edge users in a resource block (RB) a will require those cell edge users to perform uplink sounding in a sounding block (SB) a. In other words, in some embodiments there shall be an equal number of sounding blocks and resource blocks allocated.

In FIG. 11, at the end of subframe n are three sounding regions, SR 1, SR 2, and SR 3, occupying the special uplink sounding region. The subsequent subframe, downlink subframe n+1 includes three resource blocks RB 1, RB 2, and RB 3. However, again, note that the number of sounding blocks shall equal the number of resource blocks allocated to serve cell edge users.

To illustrate how the uplink sounding region can be used to form proper beamforming weights, activities in RB 1 are considered. (The base station may schedule in resource blocks RB 2 and RB 3 as well, although this example is limited to resource block RB 1.) For resource block RB 1, assume a base station BS_1 has scheduled a transmission to mobile station MS_1_1. Base station BS_2 has scheduled a transmission to mobile station MS_2_3. Base station BS_3 has scheduled a transmission to mobile station MS_3_2. In order to inform each other of the scheduling decision on resource block RB 1, the mobile station MS_1_1 performs uplink sounding in sounding region SR 1, the mobile station MS_2_3 performs uplink sounding in sounding region SR 1, and the mobile station MS_3_2 performs uplink sounding in sounding region SR 1.

Thus, when base station BS_1 is listening to sounding region SR 1, it hears MS_1_1, MS_2_3, and MS_3_2. From this information, the base station BS_1 realizes that when it transmits to mobile station MS_1_1, it needs to form a beam to MS_1_1 and nulls to MS_2_3 and MS_3_2. Likewise, when base station BS_2 is listening to sounding region SR 1, it hears MS_1_1, MS_2_3, and MS_3_2 and realizes that when it transmits to MS_2_3, it needs to form a beam to MS_2_3 and nulls to MS_1_1 and MS_3_2. When base station BS_3 is listening to sounding region SR 1, it hears mobile stations MS_1_1, MS_2_3, and MS_3_2 and realizes that when it transmits to MS_3_2, it needs to form a beam to MS_3_2 and nulls to MS_1_1 and MS_2_3.

In general, each base station shall know who are allocated in the downlink by observing the uplink sounding signals. However, the scheduling information can be sent over the backhaul by each base station to save the uplink sounding overhead. At the end of scheduling a frame by a base station, its scheduling information for its cell edge users needs to make it to other base stations that are on its approved BS/MS pair list and in the same mobile station group before the beamforming weight calculation.

The base station-to-base station communication latency over the backhaul can be longer. For instance, scheduling in the base station is usually performed two frames ahead. Hence, the scheduling information can arrive at its destination base station with a latency of less than two frames.

Determination of Transmission Probability $P_{kj}$

A collision is an event when a BS/MS pair has to null out more than M+N−2 BS/MS pairs that are on its approved BS/MS pair list and in the same mobile station group and are scheduled. To optimally maximize the number of BS/MS pairs sharing a channel resource, mobile station grouping in FIGS. 8 and 9 deliberately sets the maximum Ci_app to be M+N−2+Q that exceeds M+N−2, in some embodiments. There can potentially be M+N−2+Q (>M+N−2) interferers for certain cell edge users. Hence, a randomization scheme is used to reduce the probability of collision. However, due to this randomization, the scheduling algorithm 300 can be potentially less efficient than the scheduling algorithm 200 and achieves a lower capacity when:

a collision occurs and the signal quality is reduced; or
less than M+N−1 BS/MS pairs are allocated per resource block In addition, in some embodiments, the interference environment of the scheduling algorithm 300 will be less stable than in the scheduling algorithm 200 when collision occurs. However, this effect can be reduced by reducing $P_{kj}$, which, in turn, reduces the collision probability.

The value of Q is determined by the network traffic condition. Once Q is determined, the probability $P_{kj}$ for the $j^{th}$ mobile station in mobile station group k can be determined by setting the average number of BS/MS paired scheduled per resource block to be M+N−1−W, where W∈[0,M+N−1).

To maximize system capacity at all costs, scheduling algorithm 300 sets W to 0, in some embodiments. This implies that, on average, each BS/MS pairs only needs to null out M+N−1 BS/MS pairs. To be conservative (and prevent a collision at all costs), W may be set to a large number, in some embodiments. For mobile station group k, $P_{kj}$ is calculated only for BS/MS pairs with Ci_app>M+N−2. This implies that the actual probability of transmission ($P_{kj}$) after being scheduled for any mobile station j in the approved set of BS/MS pair i is calculated as follows:

$$\sum_{m=1}^{Ci\_app} \binom{Ci\_app}{m} \cdot m \cdot P_{kj}^m (1-P_{kj})^{Ci\_app-m} = M+N-1-W$$

$$(Ci\_app) \cdot P_{kj} = M+N-1-W,$$

$$P_{kj} = M+N-1-W/Ci\_app$$

For a Ci_app that is less than or equal to M+N−1, $P_{kj}$ is set to one, in some embodiments. For example, if there is only one mobile station group and Ci_app of all BS/MS pairs in the mobile station group is less than M+N−2, $P_{kj}$ is set to one.

Current systems that employ advance antenna schemes like multi-input-multi-output (MIMO) and beamforming systems may suffer significantly from interferences from neighboring cells. In addition, the strength of neighboring cell interferences change dynamically, depending on which users are scheduled in the neighboring cells. As a result, the link quality may change within a wide range and the link reliability may be low. Due to the dynamic interference environment, it is difficult to measure the link quality and use link adaptation to choose the best modulation and coding scheme to optimize each link between a base station and its mobile station. The grouping algorithm of the disclosed method 100, on the other hand, reduces the interference from neighboring cells to a low value below the noise floor, in some embodiments, which stabilizes the link quality. Hence, link adaptation can be used to choose the best modulation and coding scheme to optimize each link between a base station and its mobile station, and ensures its reliability while maintaining high system capacity at the same time.

In some embodiments, the enhanced beamforming with interference nulling method 100 significantly enhances the performance of mobile devices, such as laptops, personal digital assistants (PDAs), cellular phones, and so on. The beamforming method 100 reduces a dynamic interference environment to a static one by significantly reducing the interference power through smart scheduling. In some embodiments, the beamforming method 100 stabilizes link quality and enables link adaptation, which enhances link reliability while ensuring link efficiency. As a result, the beamforming method 100 will increase the cell edge user capacity significantly, in some embodiments.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method, comprising:
    identifying one or more cell edge mobile stations by an identifying base station in a wireless network;
    grouping base stations and mobile stations into approved base station/mobile station (BS/MS) pairs by the identifying base station, the approved BS/MS pairs comprising BS/MS pairs that can share resources with the identifying base station and one of its identified cell edge mobile stations;
    grouping other base stations and other mobile stations into avoid BS/MS pairs by the identifying base station, the avoid BS/MS pairs comprising BS/MS pairs that cannot share resources with the identifying base station and one of its identified cell edge mobile stations; and
    scheduling a BS/MS pair by the identifying base station using a first scheduling algorithm if the identifying base station has a fast backhaul connection to other base stations in the network, the first scheduling algorithm consisting of the following steps:
        selecting one or more cell edge users that satisfy predefined conditions for each frame by the identifying base station, wherein the selected cell edge users are part of an eligible cell edge user set;
        calculating a scheduling metric using scheduling and channel information obtained in earlier frames for all users in the eligible cell edge user set;
        selecting a cell edge user from the eligible cell edge user set, wherein the selected cell edge user has the highest scheduling metric; and
        scheduling downlink transmissions to the selected cell edge user;
    and otherwise using a second scheduling algorithm;
    wherein the scheduling algorithms schedule downlink transmissions to cell edge users while simultaneously reducing interference to cell edge users served by neighboring base stations.

2. The method of claim 1, selecting one or more cell edge users that satisfy predefined conditions for each frame by the identifying base station further comprising:
    for a given BS/MS pair, determining that the pair is not on an avoid BS/MS pair list of any BS/MS pairs already scheduled and to be scheduled under synchronous hybrid automatic repeat request conditions.

3. The method of claim 2, selecting one or more cell edge users that satisfy predefined conditions for each frame by the identifying base station further comprising:
    for the given BS/MS pair, determining that the avoid list of the pair does not contain any BS/MS pairs already scheduled and to be scheduled under synchronous hybrid automatic repeat request conditions; and
    adding the given base station/mobile station pair to the BS/MS pairs already scheduled and to be scheduled under synchronous hybrid automatic repeat request conditions, wherein the added BS/MS pair is part of a new set.

4. The method of claim 3, selecting one or more cell edge users that satisfy predefined conditions for each frame by the identifying base station further comprising:
determining that no BS/MS pairs in the new set have more than M+N−2 BS/MS pairs contained both in the new set and on the approved list of a BS/MS pair in the new set, wherein M is the number of base station antennas and N is the number of mobile station antennas of the given BS/MS pair.

5. The method of claim 1, using the second scheduling algorithm further comprising:
dividing all base station/mobile station (BS/MS) pairs into mobile stations groups that satisfy predefined conditions;
further dividing channel resources allocated to cell edge users among various mobile station groups;
sending mobile station group information and allocated resources to all base stations; and
performing independent scheduling by each base station in the wireless network for its cell edge users belonging to the various mobile station groups.

6. The method of claim 5, dividing all BS/MS pairs into mobile station groups that satisfy predefined conditions further comprising:
ensuring that BS/MS pairs in a mobile station group do not have each other on their avoid list; and
within each mobile station group, ensuring that each BS/MS pair will not need to null out, on average, more than M+N−2 BS/MS pairs on its approved BS/MS pair list belonging to the same mobile station group.

7. The method of claim 6, dividing all BS/MS pairs into mobile station groups that satisfy predefined conditions further comprising:
associating each BS/MS pair to as many mobile station groups as possible to increase its chance of being allocated resources;
ensuring that each mobile station group contains close to the same number of BS/MS pairs;
ensuring that the number of BS/MS pairs to null out are similar; and
ensuring that the number of BS/MS pairs from the same base stations are similar.

8. The method of claim 5, performing independent scheduling by each base station in the wireless network for its cell edge users belonging to the various mobile station groups further comprising:
using scheduling and feedback information collected in earlier frames to calculate a scheduling metric for each cell edge user in the resources allocated to the cell edge user mobile station group.

9. The method of claim 8, performing independent scheduling by each base station in the wireless network for its cell edge users belonging to the various mobile station groups further comprising:
choosing a cell edge user j belonging to the mobile station group that has the highest scheduling metric for a scheduling quanta.

10. The method of claim 9, performing independent scheduling by each base station in the wireless network for its cell edge users belonging to the various mobile station groups further comprising:
scheduling transmission by the identifying base station to the cell edge user j with probability $P_{kj}$, for mobile station group k.

11. The method of claim 10, performing independent scheduling by each base station in the wireless network for its cell edge users belonging to the various mobile station groups further comprising:
allocating an uplink sounding by the base station with an active user in an uplink sub-frame before the scheduled downlink transmission in a subsequent downlink sub-frame.

12. A method, comprising:
generating grouping information by a base station periodically over multiple frames, the base station being in a first cell of a wireless network, the grouping information comprising:
approved base station/mobile station pairs that are able to share resources with the base station and a cell edge mobile station identified by the base station; and
avoid base station/mobile station pairs that are not able to share resources with the base station and the identified cell edge mobile station;
if communication over a fiber optic network with other base stations in other cells of the wireless network exists:
exchanging the grouping information by the base station with base stations on both an approved base station/mobile station (BS/MS) pairs list and on an avoid BS/MS pairs list over the backbone; and
executing a first scheduling algorithm;
if communication over the fiber optic network does not exist:
sending the grouping information to high-competency base stations, wherein high-competency base stations comprise base stations having a computation power that exceeds a predefined threshold ; and
executing a second scheduling algorithm, the second scheduling algorithm comprising the following steps:
dividing all base station/mobile station (BS/MS) pairs into mobile stations groups that satisfy predefined conditions;
further dividing channel resources allocated to cell edge users among various mobile station groups;
sending mobile station group information and allocated resources to all base stations; and
performing independent scheduling by each base station in the wireless network for its cell edge users belonging to the various mobile station groups;
wherein interference to cell edge users served by neighboring base stations is reduced.

13. The method of claim 12, executing a first scheduling algorithm further comprising:
selecting one or more cell edge users that satisfy predefined conditions for each frame by the base station, wherein the selected cell edge are part of an eligible cell edge user set;
calculating a scheduling metric using scheduling and channel information obtained in earlier frames for all users in the eligible cell edge user set;
selecting a cell edge user from the eligible cell edge user set, wherein the selected cell edge user has the highest scheduling metric; and
scheduling downlink transmissions to the selected cell edge user.

14. The method of claim 13, selecting one or more cell edge users that satisfy predefined conditions for each frame by the base station further comprising:
for a given BS/MS pair, determining that the pair is not on an avoid BS/MS pair list of any BS/MS pairs already scheduled and to be scheduled under synchronous hybrid automatic repeat request conditions;

for the given BS/MS pair, determining that the avoid list of the pair does not contain any BS/MS pairs already scheduled and to be scheduled under synchronous hybrid automatic repeat request conditions; and adding the given base station/mobile station pair to the BS/MS pairs already scheduled and to be scheduled under synchronous hybrid automatic repeat request conditions, wherein the added BS/MS pair is part of a new set.

15. The method of claim 14, selecting one or more cell edge users that satisfy predefined conditions for each frame by the base station further comprising:

determining that no BS/MS pairs in the new set have more than M+N−2 BS/MS pairs contained both in the new set and on the approved list of a BS/MS pair in the new set, wherein M is the number of base station antennas and N is the number of mobile station antennas of the given BS/MS pair.

16. The method of claim 12, dividing all BS/MS pairs into mobile station groups that satisfy predefined conditions further comprising:

ensuring that BS/MS pairs in a mobile station group do not have each other on their avoid list; and within each mobile station group, ensuring that each BS/MS pair will not need to null out, on average, more than M+N−2 BS/MS pairs on its approved BS/MS pair list and belonging to the same mobile station group;

associating each BS/MS pair to as many mobile station groups as possible to increase its chance of being allocated resources;

ensuring that each mobile station group contains close to the same number of BS/MS pairs;

ensuring that the number of BS/MS pairs to null out are similar; and ensuring that the number of BS/MS pairs from the same base stations are similar.

* * * * *

UNITED STATES PATENT AND TRADEMARK OFFICE
CERTIFICATE OF CORRECTION

| | | |
|---|---|---|
| PATENT NO. | : 8,190,168 B2 | |
| APPLICATION NO. | : 12/241605 | |
| DATED | : May 29, 2012 | |
| INVENTOR(S) | : Wendy C. Wong et al. | |

It is certified that error appears in the above-identified patent and that said Letters Patent is hereby corrected as shown below:

Sheet 7 of 11, in Figure 7, Box 304, line 1, delete "furthur" and insert -- further --, therefor.

In column 16, line 32, in claim 12, delete "threshold ;" and insert -- threshold; --, therefor.

Signed and Sealed this
Twentieth Day of November, 2012

David J. Kappos
*Director of the United States Patent and Trademark Office*